Oct. 21, 1969 R. LAUBE 3,474,231

APPARATUS FOR COMPARING AN ANALOGUE VALUE WITH A DIGITAL VALUE

Filed Oct. 12, 1967 5 Sheets-Sheet 1

Oct. 21, 1969 R. LAUBE 3,474,231

APPARATUS FOR COMPARING AN ANALOGUE VALUE WITH A DIGITAL VALUE

Filed Oct. 12, 1967 5 Sheets-Sheet 2

Oct. 21, 1969 R. LAUBE 3,474,231

APPARATUS FOR COMPARING AN ANALOGUE VALUE WITH A DIGITAL VALUE

Filed Oct. 12, 1967 5 Sheets-Sheet 5

United States Patent Office 3,474,231

Patented Oct. 21, 1969

3,474,231
APPARATUS FOR COMPARING AN ANALOGUE VALUE WITH A DIGITAL VALUE

René Laube, 46 Riethalzstrasse, Zollikerberg, near Zurich, Switzerland

Continuation-in-part of application Ser. No. 350,797, Mar. 10, 1964. This application Oct. 12, 1967, Ser. No. 678,479
Claims priority, application Switzerland, Mar. 11, 1963, 3,071/63; Sept. 17, 1963, 11,551/63
Int. Cl. G06k *17/00*
U.S. Cl. 235—61.7 13 Claims

ABSTRACT OF THE DISCLOSURE

Apparatus for comparing an analogue value with a digital value for use, per example, in automatic program control systems for positioning a tool. The invention uses electric or photo-electric switching paths with rapidly rotating elements in a direct comparison-arrangements.

This invention relates to apparatus for comparisons between two values, for instance, between an actual value and a desired value. The present application is a continuation-in-part of Ser. No. 350,797 filed on Mar. 10, 1964, now abandoned. Apparatus of this kind are used, for instance, in automatic programme control systems for positioning the tool of a machine tool, apart from other technical uses. The invention provides for very simple comparisons, at a reduced outlay.

It is known that in problems requiring, for instance, the comparison of a digitally represented set value with an actual value represented in analogue form, the actual value must first be given a separate analogue-to-digital conversion, whereupon the now digitally represented actual value is compared with the set value in a logical combination and, in the event of equality between the set value and the actual value, an order signal is produced. As a rule, the outlay is very extensive, since in some cases complicated digital measuring principles are used for the actual value and in other cases the actual value is split up into very small units which are counted in electronic counters, after which the state of the counter is compared with the set value.

Purely electronic systems operate very fast but are rather costly. Electro-mechanical arrangements are cheaper, but use stepping switch mechanisms which operate slowly and wear fairly rapidly. It has so far proved impossible to use a number of electric switches having continuously rotating wipers interconnected, for instance, in a decade transmission system, since the angle through which, for instance, a hundreds-wiper rotates when a ones-wiper rotates through an angle corresponding to a single unit is so very small that no clearly defined change in the contact state can be provided. It is a main object of the invention to enable electric or photoelectric switches having rapidly rotating wipers to be used in comparison-arrangements, but the invention is not limited to the use of such switches and certainly does not exclude the use of electronic circuit elements.

The main feature of the arrangement according to the invention is that first means are provided which represent one of the values—the digital value—in digital form, and second means are provided which represent the other value—an analogue value—in analogue form, the first and second means participating directly in a comparison circuit arrangement, auxiliary values being used if the digital value has at least two digits.

Embodiments of the arrangement according to the invention and details of variants are illustrated in the drawings wherein.

Figure 1:
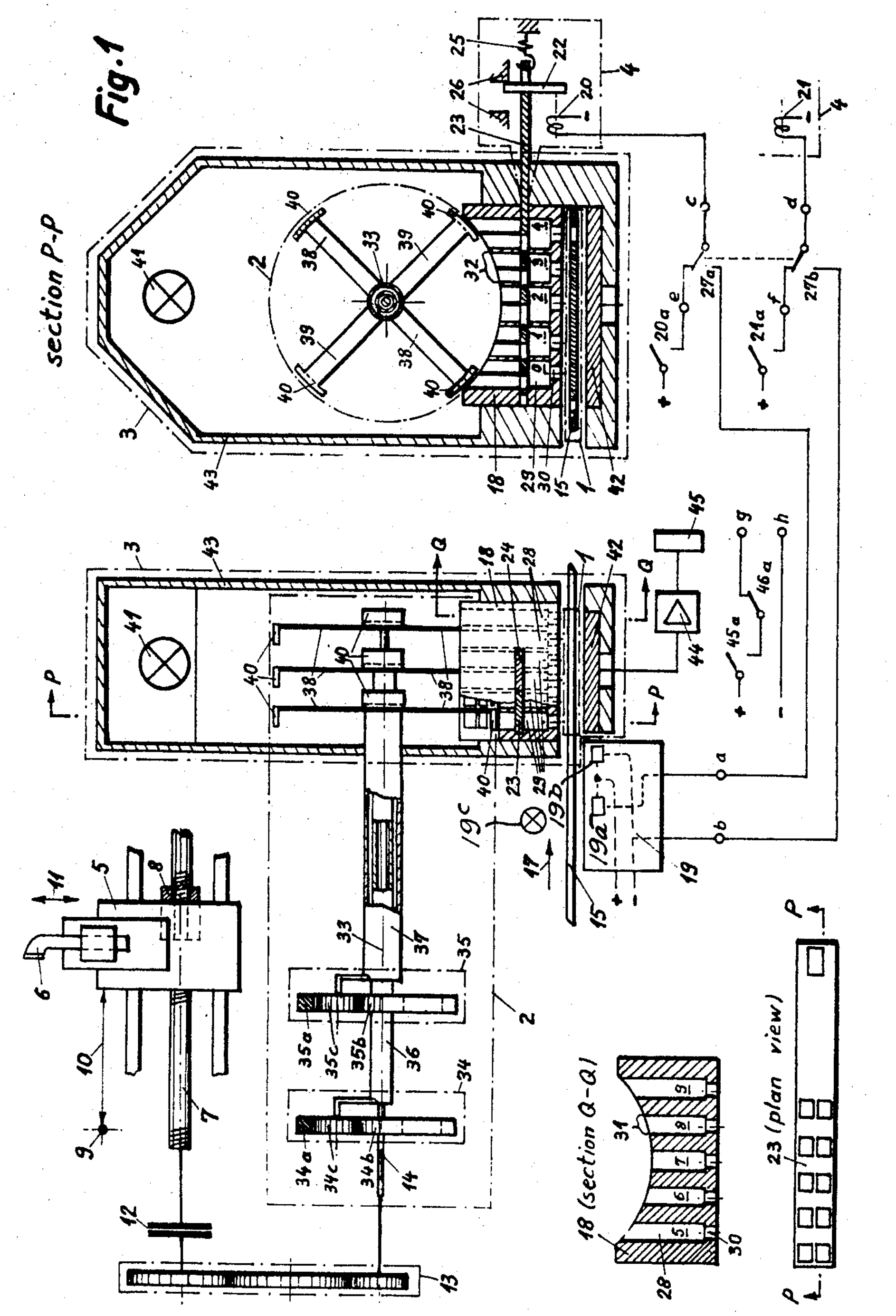
FIG. 1 illustrates an embodiment having a photo-switching comparison circuit arrangement.
Figure 2:
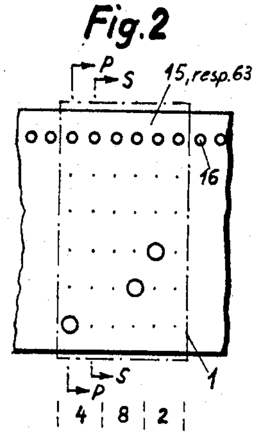
FIG. 2 illustrates part of a perforated tape suitable for FIGS. 1 and 7.

FIGS. 1 and 2 illustrate an embodiment for making comparisons between a set value and an actual value. The main elements of the apparatus are first means 1, second means 2 and a comparison circuit arrangement 3. Actuating elements 4 are controlled by auxiliary values.

A carriage 5 of a lathe guides a tool 6 (cutting tool) which machines a workpiece. A lead screw 7 reciprocates the carriage which bears a fixedly mounted screw-threaded bushing 8. The position of the carriage 5 in relation to a zero point 9 is determined by the actual value of a distance 10 between the carriage 5 and the zero point 9.

The workpiece can be machined automatically according to a programme if the same is supplied to an appropriate system for controlling the lathe, the control system comprising an embodiment of the apparatus according to the invention. The programme is subdivided into operation phases and contains movement orders, such as the selection of lathe spindle speed, feed rate (of carriage 5), and the feed direction of carriage 5 (advance and return movement), and also contains set values for the distance 10. The first movement orders of the programme set the lathe in motion so that carriage 5 moves from a former position into a new position in which the actual value of the distance 10 corresponds to the set value thereof for the first operation phase. The apparatus performs a comparison between the set value and the actual value—which latter varies continuously because of the movement of carriage 5—and in the event of equality between the set value and the actual value the apparatus produces an order signal. The order signal causes the old movement orders, which are no more required, to be removed from the control system and replaced by new movement orders, and also causes the set value for the first operation phase to be cancelled and the set value of the second operation phase to be compared with the actual value. This concludes the first operation phase. This cycle is repeated for each operation phase until the end of the programme. Operation phases without any set value can be programmed in the programme, in which event an order signal is produced as a result of implemented movement orders. This occurs when, for instance, a recessing-tool or parting-off tool carriage separate from the carriage 5 is caused by a movement order to automatically make a fixed recess in the workpiece, a limit switch producing the order signal when the recessing-tool carriage returns (after the completion of the recess) to its normal position. A traversing direction 11 of the tool 6 which is perpendicular to the traversing direction of carriage 5 can be controlled, for instance, by a templet and by abutments which can be selected in the programme, to give the workpiece its shape. The direction 11 can also be controlled by means of a second arrangement whose order signals cooperate with the order signals of the first arrangement to control a programme; for instance, an order signal of the first arrangement causes after an operation phase a set value for a distance in the direction 11 to be compared with the actual value of such distance. When a number of identical workpieces are manufactured, the same programme is fed into the control system repeatedly.

Before commencing the machining of a batch of workpieces, the position of the zero point 9 on the lathe is determined to ensure that tool 6 is in the correct starting position relative to the workpieces. When the second means 2 are in the zero position (this zero position will be described in greater detail hereinafter) and carriage 5 is at the desired zero point—i.e., the distance 10 is zero—a coupling 12 is engaged so that a gearing system 13 is rigidly connected to a lead screw 7. The coupling 12 stays engaged for as long as the carriage 5 stays at the zero point 9. When, subsequently, a new zero point is required, carriage 5 is first moved to the old zero point 9, so that the second means 2 may be in the zero position, whereupon coupling 12 is disengaged, carriage 5 is moved to the new zero point; and the coupling 12 is reengaged. The lead screw 7 is in the zero position when carriage 5 is in a desired zero position.

When carriage 5 moves away from the zero point 9, the angle of rotation of the lead screw 7 and coupling 12 from their respective zero position is proportional to the actual value of the distance 10. By way of the engaged coupling 12 and of the gearing system 13, the lead screw 7 drives a shaft 14. The transmission ratio of the gearing system 13 is such that, for instance, in the present case, the shaft 14 rotates through 180° for a 10 mm. change in the actual value. The actual value, which is an analogue value, is therefore represented in analogue form by the angle through which the shaft 14 rotates out of the zero position.

The set value of the distance 10 for any operation phase forms a data item and is programmed on a perforated tape 15 (FIGS. 1 and 2) as an information support, the tape 15 being formed with transport holes 16. The set value, which is a digital value, is, for instance, 482 mm. and is represented in the decimal system as a number having three digits. To simplify the understanding of the invention, the description hereinafter will be based on set values which have three digits and a 1 mm. increment; however, if the gearing system 13 has an appropriate transmission ratio an increment, for instance, of 0.01 mm. is possible.

To facilitate an understanding of the description of the apparatus, the following definition will be made. In a digital value—i.e., a set value (e.g., 482 mm.)—the place of the ones digit (the digit 2) will be called the first place or the smallest place since it is the place having the smallest unit. The place of the tens digit (the digit 8) will be called the 2nd place. The place of the hundreds digit (the digit 4) will be called the 3rd place or the highest place since it is the place having the highest unit. The words "place" and "places" as used herein are always to be understood as referring to a place or a number of places of the digital value—i.e., of the set value.

Figure 5:
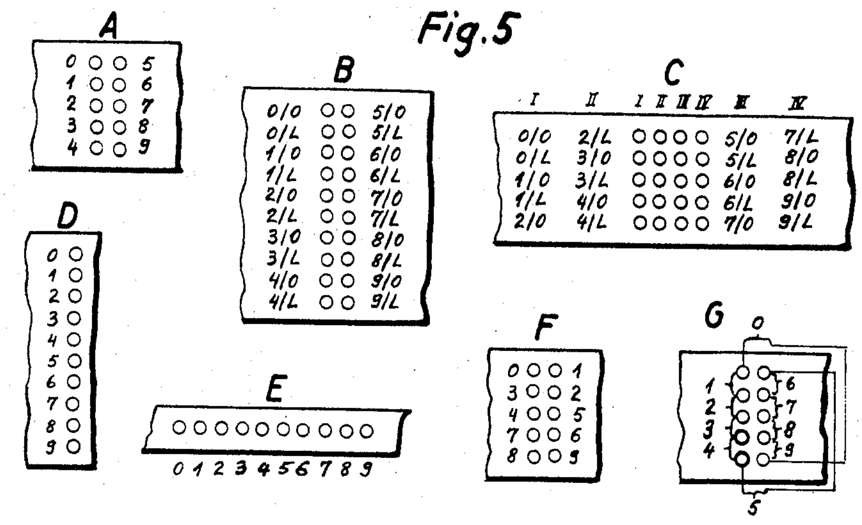
FIG. 5 illustrates various perforation patterns.

The set value is represented in programming by means of a system of perforations in the perforated tape 15, a hole being punched therein for each digit in accordance with a hole pattern A shown in FIG. 5. The pattern A diagrammatically shows the position of the holes for the various digits of a place in a "1 out of 10" code—i.e., a code with one punch hole of ten possible holes; the transport holes 16 and the unused part of the tape 15 are not shown. FIG. 2 shows the perforation for the set value 482 mm. on the tape 15 which has five tracks. The positions of the unpunched holes of the piece of tape 15 for the set value 482 mm. are shown as dots. According to pattern A each place requires two lines of the tape—i.e., six consecutive lines to represent the complete set value. The perforations for the three places are disposed in the same order as that in which the three digits of the set value occur.

A set value reaches a comparison by moving the tape 15 one step in the direction 17 in FIG. 1; the perforation for the set value is herewith given in the comparison circuit arrangement 3 below a screening or filter element 18. Before the perforation is given one step below the screening or filter element 18 the perforation is scanned by a reading device 19. The same is shown in block schematic form in FIG. 1 and can have, for instance, brush contacts or photo cells for scanning the perforation. As shown in FIG. 1 the reading device 19 includes two photo cells **19*a* and 19*b* in circuit with electromagnets 20 and 21 respectively. A light source 19*c* is provided above the tape 15 and the reading device 19**.

The reading device 19 examines each place, except for the highest place, to see whether any of the digits 0, 1, 2, 3 or 4, or respectively, 5, 6, 7, 8 or 9 is programmed. An auxiliary value 0 is derived from the digits 0 to 4 and an auxiliary value L is derived from the digits 5 to 9. The auxiliary values have the designation of the place immediately above the place from which they have been derived. In this example, the 2nd auxiliary value—i.e., 0—was derived from the 1st place (digit 2) and the 3rd auxiliary value—i.e., L—was derived from the 2nd place (digit 8). No auxiliary value is derived from the 3rd place (digit 4), nor is a 1st auxiliary value derived.

The auxiliary values control two identical actuating elements 4 which are disposed separately from the first means 1 and second means 2. Each element 4 comprises an electromagnet 20, 21 respectively, an armature 22, a mask 23 and 24 respectively, a spring 25 and two armature stops 26. One actuating element 4 is shown complete in FIG. 1; of the other actuating element 4 the only items shown are the electromagnet 21 (right at the bottom right-hand corner of FIG. 1), the mask 24 (in the circuit arrangement 3) and (in plan) the mask 23 (or 24) (bottom left-hand corner of FIG. 1). The masks 23, 24 are guided in a slot in the screening element 18 so as to be movable over a distance bounded by the armature stops 26. The spring 25 locates the mask 23 when the electromagnet 20 is in the de-energized state.

A power supply is connected to the points marked + and −. Changeover contacts **27*a*, 27*b* are changed over by pulse operation shortly before the perforation is given into the comparison circuit arrangement 3; consequently, the electromagnet 20 (or 21) is energized from the reading device 19** via the terminals *a* and *c* (or *b* and *d*) for an auxiliary value L but not for an auxiliary value 0. When the contacts **27*a*, 27*b* return to their normal positions, the energized electromagnet 20 (or 21) sticks via its own contact 20*a* (or 21*a***) and a terminal *e* (or *f*), to unstick the next time that the contacts **27*a*, 27*b* change over shortly before a new perforation is given. The electromagnet 20 and the mask 23 are controlled by the 3rd auxiliary value. The electromagnet 21 and the mask 24 are controlled by the 2nd auxiliary value. The perforation is given below the screening element 18** after the contacts 27a, 27b have returned to the normal position.

The first means 1 (FIGS. 1 and 2) comprise the piece of perforated tape 15 which represents the set value of the distance 10 in digital form and which is disposed below the screening element 18. The material forming the tape 15 should be highly impervious to light.

The screening element 18 has for the 1st place $2\times5=10$ channels 28 (FIG. 1, section along the line Q—Q) and $2\times(2\times5)=20$ channels 29 (FIG. 1, section along the line P—P) for the 2nd and 3rd places, the channels 29 opening into two separate halves in the top part of the screening element 18. The positions of the bottom channel apertures 30 for the channels 28, 29 coincide with the positions of the possible holes in a given perforation. In order to provide a more detailed yet simple designation for individual channels 28, 29 and, subsequently, other parts, such parts are described as belonging to a place or a digit of a set value and have in some of the drawings small underlined digits when they are in a particular relationship to the given possible perforation for such digit. The top aperture 31 for the channels 28 for the 1st place are as large as one half of the top apertures 32 for the channels 29 for the 2nd and 3rd places. The centres of the top channel apertures 31, 32 are at the same intervals along an axis 33 as the centres of the bottom apertures 30. As seen from the axis 33, the centres of the apertures 31 and 32 are offset from the digits 0 to 4 and 5 to 9 respectively by 18°.

The mask 23 (or 24) always closes one or the other half of the apertures 32 for the 3rd (or 2nd) place in respect of the channels 29, the closed half being the right-hand half (FIG. 1, section along the line P—P) when the associated electromagnet 20 (or 21) is de-energized.

The 2nd means 2 have two planetary transmission systems 34, 35 comprising stationary internally toothed gears 34a, 35a, three shafts 14, 36, 37 having one group each of four wipers 38, 39, and a covering 40 on each wiper 38, 39. Through the agency of a gear 34b mounted on the shaft 14 and of a satellite gear 34c, the shaft 14 drives a hollow shaft 36 which rotates around the shaft 14. Through the agency of a gear 35b on the hollow shaft 36 and of a satellite gear 35c, the hollow shaft 36 drives a hollow shaft 37 which rotates around the hollow shaft 36. The ratio reductions provided by the planetary transmission systems 34, 35 are such that the angle of rotation of the shaft 36 is ten times smaller than the angle of rotation of the shaft 14, and the last-mentioned angle of rotation is ten times smaller than the angle of rotation of the shaft 36. Mounted on each of the shafts 14, 36, 37 are two opposite wipers 38 and two opposite wipers 39 offset at 90° therefrom. The wipers 38, 39 bear the coverings 40 which are larger than two halves of one channel aperture 32; as the shafts 14, 36, 37 rotate, the coverings 40 pass very close above the screening element 18. The coverings 40 of the shaft 14 rotate above the channels 28 associated with the 1st place of the set value, the coverings 40 of the shaft 36 rotate above the channels 29 associated with the 2nd place, and the coverings of the shaft 37 rotate above the channels 29 associated with the 3rd place. The coverings 40 on the wipers 38 rotate above the channels 28 or 29 for the digits 0 to 4 of one place and the coverings 40 on the wipers 39 rotate above the channels 28 or 29 associated with the digits 5 to 9 of one place. The coverings 40 rotate anti-clockwise for an increase in actual value (FIG. 1, section along the line P—P) and clockwise for a decrease in actual value.

Advantageously, if the actual value varies continuously, the second means 2 rotate continuously with little mechanical wear.

The second means 2 are in the zero position when the corresponding coverings 40 simultaneously cover one-half each of the apertures 32 for the digits 0 and 9 of the 2nd and 3rd place (as shown in the section along the line P—P) and the whole aperture 31 for the digit 0 of the 1st place.

Any angle of rotation (referred to the zero position) of the shafts 14, 36, 37 represents the actual value of the distance 10 in analogue form. Because of the angles of rotation, the wipers 38, 39 have a definite position for every actual value of the distance 10. This position characteristic of an actual value of the three groups of wipers 38, 39 relatively to the screening element 18 is compared in the circuit arrangement 3 with the perforation for the set value by means of the auxiliary values.

The arrangement 3 has a light source 41, a photocell 42, a casing 43 and the screening element 18. Also, the first means 1—formed by the tape 15 in the present case—the second means 2 comprising the wipers 38, 39 and the coverings 40, and the actuating elements 4 with their masks 23, 24 also participate directly in the arrangement 3. The light source 41 and the casing 43 are so constructed as to provide very good illumination without disturbing shadows on the channel aperture 31, 32 so that only those apertures 31, 32 which are directly covered by coverings 40 receive no light. To this end, the inner walls of the casing 43 are formed as a mirror so that the uncovered apertures 31, 32 are illuminated from various directions, and the light coming from these various directions cannot be interrupted simultaneously, for instance by wipers 38, 39. The walls of the channels 28, 29 also have a highly reflective surface to ensure satisfactory transmission of the light through the channels 28, 29.

The set-value perforation opens for each place a channel aperture 30 from which light issues. When light passes through open channels 28, 29, light is incident on the photocell 42 and produces therein an electric current which is supplied to a flip-flop amplifier 44. Provided that there is no coincidence between the set value and the actual value, the photocell 42 stays illuminated and a relay 45 is not energized by the amplifier 44, even through the actual value meanwhile changes continuously.

When the three channels 28, 29 opened by the perforation on the underside are simultaneously covered at the top by corresponding coverings 40 and masks 23, 24, light ceases to reach the photocell 42 and the relay 45 picks up. This is the actual-value position of the three groups of wipers 38, 39 with the coverings 40 in the event of coincidence between the set value and the actual value. The relay 45 has a contact 45a which is closed thereby to produce an order signal. The same is transmitted, via a closed contact 46a, as a control voltage applied to terminals g and h to control the lathe. The contact 46a is opened to suppress unwanted order signals while the actuating elements 4 are being adjusted and the perforation is being given into the comparison circuit arrangement 3. Of course, there is an error in the coincidence of the set value and actual value, just as in a measuring device. The order signal is used as previously described. The perforation is removed from the comparison circuit arrangement 3 by a perforation for a fresh set value being given.

The purpose of the auxiliary values is to help provide a satisfactory comparison. If auxiliary values and the masks 23, 24 were not used, the three channels 28, 29 opened at the bottom by the perforation might for some set values never be closed completely and simultaneously to the passage of light, more particularly when the 1st and 2nd places have a digit 0 or 9. If, for instance, the channel 28 for the digit 9 of the 1st place is completely covered by a covering 40, two channels 29 for the 2nd place are only approximately half-covered, and so in this case no channel 29 for the 2nd place can be completely covered without the mask 24. This disadvantage would not be obviated by an increase in the size of the coverings 40, since this might lead to the production of order signals in the absence of coincidence between the set value and the actual value.

Figure 6:
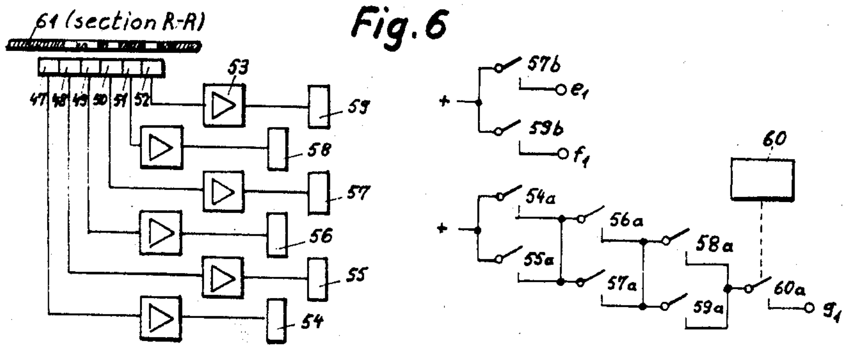
FIG. 6 shows one possible way in which auxiliary values can be derived by the comparison circuit arrangement illustrated in FIG. 1.

If technical conditions in respect of the photocell 42 are unsatisfactory, for instance, if the brightness current to darkness current ratio or the like is unsatisfactory, a number of smaller photocells can be used instead of a single photocell 42, the photocells acting via amplifiers and relays to produce component order signals. The same are combined in a logical combination from which the order signal is obtained. A logical circuit for this purpose and having these features is shown in FIG. 6; this circuit is also of use in another embodiment which will be described hereinafter.

Figure 3:
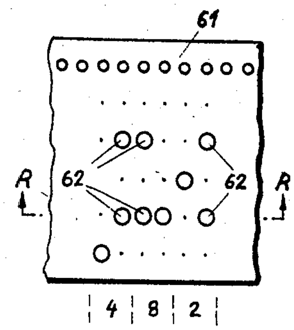
FIG. 3 illustrates a part of a perforated tape suitable for FIG. 6.

The auxiliary values can be derived from the digital—i.e., the set—value by means of a part of the arrangement 3 itself, in which event the reading device 19 is omitted. This possibility is shown in FIG. 6, and the changes made to the embodiment illustrated in FIG. 1 will be described in greater detail hereinafter. The photocell 42, flip-flop amplifier 44 and relay 45 are respectively replaced by six photocells 47–52, six flip-flop amplifiers 53 and six relays 54–59. The reading device 19 is disconnected from the terminals *a* and *b* and instead a terminal $e_1$ is connected to the terminal *e* and a terminal $f_1$ is connected to the terminal *f*. Instead of the contacts 45*a*, 46*a* and the terminal *g*, seven contacts 54*a*–60*a* and one terminal $g_1$ are used. The six photocells 47–52 are used instead of the photocell 42, the photocell 47 being used for the digits 0–4 of the 3rd place, the photocell 48 being used for digits 5–9 of the 3rd place, the photocell 49 being used for the digits 0–4 of the 2nd place, the photocell 50 for digits 5–9 of the 2nd place, the photocell 51 for digits 0–4 of the 1st place, and the photocell 52 for digits 5–9 of the 1st place. The perforated tape 15 is replaced by a perforated tape 61 (FIGS. 3 and 6); in addition to the perforation for the set value of 482 mm. given in FIG. 2, the tape 61 has two so-called blind holes 62 punched into each of the free lines (FIG. 3), the holes 62 saying nothing about the set value. The purpose of the blind holes 62 is to ensure that one of the two photocells 47 or 48, respectively 49 or 50, respectively 51 or 52 associated with each place is illuminated continuously after the perforation has been written-in to prevent any production of wrong component order signals. In this embodiment, the contacts 27*a*, 27*b* are changed over pulsewise while the perforation is being given, to prevent the electromagnets 20, 21 from picking up. The auxiliary values are made known consecutively after the giving of the perforation while the actual value changes.

It will be assumed that the set value is 482 mm. and the actual value is initially 255 mm. and increases continuously after the perforation has been given. At the actual value 255 mm. all the photocells 47–52 are illuminated, and the flip-flop amplifiers 53 controlled by the photocells 47–52 do not energize the relays 54–59. When the actual value reaches 262 mm., the relay 58 picks up since the photocell 51 ceases to be illuminated because a covering 40 covers the channel 28 associated with the digit 2 of the 1st place. The fact that the relay 58 picks up means that the 2nd auxiliary value 0 is derived from the 1st place of the set value. When the actual value becomes about 263 mm., the relay 58 drops. When the actual value is about 280 mm., the relay 57 picks up in just the same way, signifying that the 3rd auxiliary value L is being derived from the 2nd place. The relay 57 drops when the actual value reaches about 285 mm. An auxiliary value 0 is derived from the particular place concerned when the relay 56 (or 58) picks up, and an auxiliary value L is derived when the relay 57 (or 59) picks up. The relay 57 (59) has a contact 57*b* (59*b*) which, when the relay 57 (59) is energized, energizes the electromagnet 20 (21). The electromagnets 20 (21) then stick via their contacts 20*a* (21*a*) until the next perforation for a set value is given. Each of the contacts 54*a*–59*a* can produce a component order signal. The contacts 54*a*–59*a* are logically combined with one another to produce order signals. When the actual value is 482 mm., the serially connected contacts 54*a*, 57*a*, 58*a* are closed and therefore produce the order signal, since the corresponding photocells 47, 50, 51 are no longer illuminated. Because of the blind holes 62, the contacts 55*a*, 56*a*, 59*a* do not close. A device 60 having a contact 60*a* suppresses the transmission of unwanted order signals between the terminals $g_1$ and *h*, the contact 60*a* opening shortly before the perforation is given and closing with delay, during the comparison, after the first pick-up of a relay 58 or 59. The reason for the delayed closure of the contact 60*a* is to ensure that all the actuating elements 4 have always been correctly set before an order signal is transmitted.

The arrangement can also be embodied to be operated by a radiation other than light, in which event the light source 41 is replaced by some other radiation producer and the photocell 42 is replaced by an appropriate radiation-measuring cell. Instead of light being kept away from particular places by coverings 40 (the normally energized principle), individual light beams can of course be transmitted in particular directions by mirrors to provide a comparison circuit arrangement (normally-off principle). A second means having substantially straight movements can also be used which perform the same function as the second means 2 with their circular rotation; for instance coverings can be used which are moved like sliders, just like the masks 23 and 24.

The comparisons can be made by pneumatic means; for instance, a negative pressure can be produced in the casing 43 and a diaphragm switch can be provided in the wall of the casing 43. The negative pressure which can be produced in the casing 43 stays small so long as air can enter the casing 43 through a continuously open channel 28 or 29. The diaphragm switch takes the place of the contact 45*a* to produce an order signal when all the channels 28 and 29 have been closed so that the negative pressure is sufficient to operate the diaphragm switch.

Figure 7:
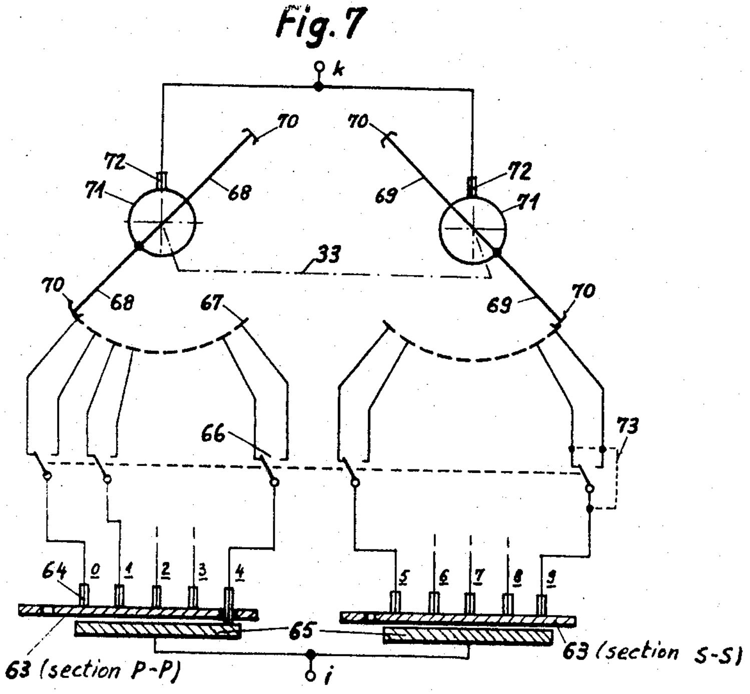
FIG. 7 illustrates a switching path for an electric comparison circuit arrangement.

An electric comparison circuit arrangement can be used instead of the photo arrangement 3. Part of an electric comparison circuit arrangement is shown in FIG. 7; only one switching path—for the 3rd place is shown. The arrangement 3, amplifier 44, relay 45 and contact 45*a* are replaced by three switching paths. A perforated tape 63 has the same form and perforation for the set value 482 mm. as is shown in FIG. 2. In this embodiment the tape 63 is made of an electrically insulating substance. The piece of tape 63 for the 3rd place is scanned by ten brushes 64 disposed opposite a contact plate 65. In the diagrammatic view given in FIG. 7, the tape 63 and plate 65 appear twice—in two parallel sections—to show the scanning of the holes for the digits 0–4 and 5–9 respectively. A terminal *i* is connected to the plate 65. The central contact spring of a changeover contact 66 is connected to each brush 64, and one contact strip 67 is connected to each of the outer contact springs of the contact 66. The shaft 37 is fitted with two wipers 68 instead of the two wipers 38 and with two wipers 69 instead of the wipers 39. There are contacts 70 instead of the coverings 40. The contacts 70 move over the contact strips 67, such movement being anti-clockwise for an increase in actual value and clockwise for a decrease in actual value. The contacts 70 are electrically connected via slip rings 71 and brushes 72 to a terminal *k*. The electromagnet 20 and the spring 25 operate the ten changeover contacts 66 in the same way as the mask 23 is operated in the earlier embodiment. The changeover contacts 66 are in the position shown in FIG. 7 for the de-energized electromagnet 20. A similar path is provided in association with the 2nd place, but the wipers 68, 69 are mounted on the shaft 36, the ten changeover contacts 66 are operated by the electromagnet 21, and the ten brushes 64 scan the piece of tape 63 for the 2nd place. A similar path is provided for the 1st place; the wipers 68, 69 are mounted on the shaft 14 and the ten brushes 64 scan the piece of tape 63 for the 1st place; however, the ten changeover contacts 66 are missing and instead each of the two contacts strips 67 for each digit are conductively connected to the corresponding brush 64 as shown by a connection 73 at one position. The three paths to the three places are connected in series via the terminals *i* and *k* and, instead of the contact 45*a*, are connected in series between the positive side of the power supply and the contact 46*a*. When all the three paths are closed for the passage of a current, therefore, the same function as when the contact 45*a* is closed is achieved. Coincidence between the set value and the actual value produces the order signal since the wipers 68, 69 take up for each actual value of the distance 10 the same position relatively to the contact strips 67 as the wipers 38, 39 of the earlier embodiment take up in relation to the channel apertures 31, 32. The two contact strips 67 associated with any one digit corresponding to a single channel aperture 31 or 32.

Of course instead of an electric a magnetic switching path can be constructed which can be closed for producing a component order signal. The component order signals of a number of paths are logically combined to form the order signal.

Figure 4:
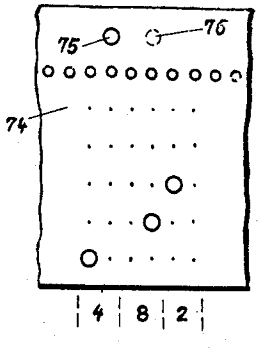
FIG. 4 illustrates a part of a perforated tape in which auxiliary values are stored separately from a digtal value.

Alternatively, the digital value—i.e., the set value—and the auxiliary values corresponding thereto—i.e., derived therefrom—can form two separate data items which are stored in one or more information supports. To this end, for instance, if a perforated tape 74 shown in FIG. 4 and having six tracks is used, the auxiliary values are derived from the set value in accordance with the following rule—digits 0–4 give 0 and digits 5–9 give L—and this is punched into the tape 74 as a data item separate from the set value. The derivation can be effected manually by a programmer or by some sort of device. For the set value of 482 mm. without the auxiliary values the perforation of the tape 74 is the same as in FIG. 2, and an extra hole 75 yields the data that the 3rd auxiliary value is L. A hole 76 will yield the data item that the 2nd auxiliary value is L. No hole is punched for the auxiliary values 0. This embodiment has no reading device 19 nor contacts 20*a*, 21*a*, 27*a*, 27*b*, but a contact plate and two brushes are additionally used like the contact plate 65 and the brushes 64. To this end, the two extra brushes are so mounted that during the comparison the tape 74 at the position of the hole 75 is sensed continuously by one brush and the tape 74 at the position of the hole 76 is sensed continuously by the other brush. The extra contact plate is connected to the positive terminal of the supply, the brush for the hole 75 (3rd auxiliary place) is connected to the terminal *c* and the brush for the hole 76 (2nd auxiliary value) is connected to the terminal *d*. The corresponding brush makes contact with the contact plate through the hole 75 or 76 and the electromagnet 20 (or 21) is energized in accordance with the corresponding auxiliary value. Of course, the auxiliary values can be stored on an information support which is separate from the tape 15 and is synchronised therewith.

Figure 9:
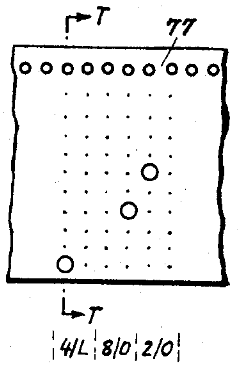
FIG. 9 illustrates a part of a perforated tape suitable for FIG. 8.

In another embodiment, the digital value—i.e., the set value—and the auxiliary values co-operate after derivation to form a data item which is stored in a perforated tape 77 (FIG. 9). In this case the programmer or a device derives the auxiliary values, whereafter the same are used so to affect the encoding of the digits of the set value that various elements, such as the actuating elements 4, are not required for processing the auxiliary values. To this end, the 2nd auxiliary value affects the encoding of the digit of the 2nd place and the 3rd auxiliary value affects the encoding of the digit of the 3rd place. A corresponding perforation pattern B is shown in FIG. 5; a hole is punched for a digit and for the auxiliary value affecting the encoding of such digit. Each digit of the set value except for the first-place digit has two possible encodings—one when the affecting auxiliary value is 0, and another when the affecting auxiliary value is L. The holes are designated by the digit and auxiliary value e.g., 4/*L*. For the sake of consistency the digits of the first place are encoded as if a particular "1st auxiliary value" were always present, e.g., "1st auxiliary value 0"; however, such encoding could be effected in accordance with perforation pattern A if a construction for the 1st place corresponds to pattern A. FIG. 9 shows the perforation in the tape 77 in accordance with pattern B for the set value of 482 mm. and shows the derived auxiliary values, the "1st auxiliary value 0" having been assumed for the encoding of the digit of the 1st place.

Figure 8:
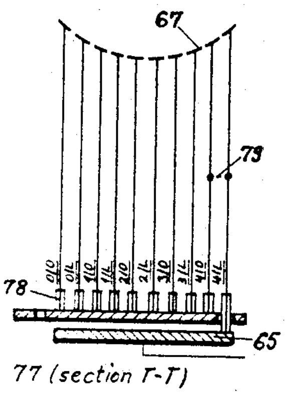
FIG. 8 illustrates a modified form of FIG. 7 for an embodiment in which a digital value and auxiliary values co-operate after derivation to form one data item.

The operation of this embodiment will be described in greater detail with reference to a variant shown in FIG. 8 of the switching path shown in FIG. 7. FIG. 8 shows only one half of the variation of the switching path shown in FIG. 7, but the other half is varied in a correspondingly similar fashion. The tape 63 and the ten brushes 64 are replaced by the tape 77 and twenty brushes 78. The twenty brushes 78 are disposed opposite the contact plate 65. Each brush 78 is directly connected to a contact strip 67, the changeover contacts 66 being omitted. Of the twenty brushes 78, only one particular brush 78 makes contact with the plate 65 through the perforation in the tape 77, and so only one particular contact strip 67 is conductively connected to the plate 65. The same result is therefore achieved as in the switching path illustrated in FIG. 7 where the contact plate is conductively connected, through the perforation of the tape 63, to a particular brush 64 via the associated control changeover contact 66 having the same contact strip 67. In other words, the function of the gating changeover contact 66 for any place is contained in the encoding of such place. One such modified switching path is provided for each place, but in the path for the 1st place the two contact strips 67 and the brushes 78 for each digit are short-circuited as shown in one position by a connection 79. The advantage of the embodiment illustrated in FIG. 8 over the embodiment illustrated in FIG. 7 is that the reading device 19, the electromagnets 20, 21 and the elements 20*a*, 21*a*, 22, 25, 26, 27*a*, 27*b* can be omitted.

A very wide variety of perforation patterns can be devised for this embodiment; one such pattern C (FIG. 5) is shown which is very suitable for a standard perforated tape having five of eight tracks. To embody the arrangement for pattern C, merely the brushes 78 should be grouped differently. Of course the patterns B and C can be used, for instance, in an embodiment having a photo-controlled comparison circuit arrangement. To use pattern B in an embodiment similar to FIG. 1, each channel 28, 29 is subdivided into two channels and the actuating elements 4, the reading device 19 and the contacts 20*a*, 21*a*, 27*a* and 27*b* are omitted.

Figure 10:
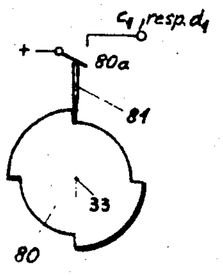
FIG. 10 illustrates an embodiment for deriving auxiliary values from an analogue value.

For special purpose, for instance, with a slowly varying analogue value or actual value and with a frequently changing digital value or set value, the auxiliary values can be derived from the analogue value—i.e., from the actual value. A corresponding embodiment will be described with reference to a variant of the construction illustrated in FIG. 1. To this end, disc cams 80 (FIG. 10) are fixedly mounted on the shafts 14 and 36 instead of the reading device 19 and the contacts 20*a*, 21*a*, 27*a* and 27*b* and each operate a contact 80*a* via a tappet 81. The two disc cams 80 rotate around the axis 33 as the actual value varies. The contact 80*a* is opened and closed alternatively as the disc cam 80 rotates, the switching condition changing after each quarter-revolution of the disc cam 80—i.e., after each 5 mm. change in the actual value, and closes for the first time, with increasing actual value from the zero point 9, shortly before the completion of the first quarter-revolution referred to the zero position. When the contact 80*a* is open, an auxiliary value 0 is derived from the actual value, and when the contact 80*a* is closed an auxiliary value L is derived from the actual value. Through the agency of the disc cam 80 on the shaft 14, the 2nd auxiliary value is derived from an actual value, and through the agency of the cam disc 80 on the shaft 36 the 3rd auxiliary value is derived from an actual value. The contact 80*a* for the shaft 14 is connected via a terminal $d_1$ to the terminal *d* and controls the electromagnet 21, while the terminal 80*a* on the shaft 36 is connected via a terminal $c_1$ to the terminal *c* and controls the electromagnet 20. The electromagnets 20, 21 stay energized for as long as the associated contacts 80*a* stay closed. By means of the movements of the tappets 81, the masks 23 and 24 can be directly controlled through linkages provided that the tappet movements are accurate and of a flip-flop nature. In the case of set values having many places, the accuracy at which the contacts 80*a* operate may cause difficulties, although logical combinations and storage elements can provide some improvement.

For some applications of the apparatus, the analogue value—i.e., the actual value—can be remotely transmitted, for instance, by means of synchros, selsyn motors.

The arrangement can be embodied for various perforation patterns and some other patterns D–G are shown in FIG. 5. The pattern G, for a "2 out of 10" code, has two holes for each digit. The two holes for the digit 4 are shown in heavier line than the others. Some patterns are better for some constructions than for others; for instance, the pattern F is suitable for a system using electrical switching paths of the kind shown in FIG. 7 and having correspondingly arranged brushes 64, while the pattern G is suitable for a system of the kind shown in FIG. 1 but with appropriately enlarged coverings instead of the coverings 40 so that two channel apertures 31 or 32 for any one place can be covered. Of course, in developing a new pattern there is a very large choice in the arrangement of the holes for the digits for constructions having electric switching paths.

The digital values—i.e., the set values—need not necessarily be represented in decimal form and other systems, for instance, the binary system, are possible if the construction of the arrangement is adapted appropriately. In any other system of numbers there are, as in the decimal system, an auxiliary value 0 for the first half of the possible digits (digits of lower value) and an auxiliary value L for the second half (digits of greater value).

A digit in a "*x*" system (a numerical system to base *x*) can in some cases be encoded in codes other than a "*n* out of *x*" code and be processed without recoding in an appropriately adapted construction of the arrangement; for instance, a digit in the decimal system is biquinarily encoded—i.e., encoded on a "2 out of 7" basis—a binary place and a quinary place occurring and, for instance, in a six-place decimal value a total of twelve binary and quinary places occurring and eleven auxiliary values being used. Values unsuitably encoded for comparison are first recoded into some appropriate form, then processed.

The arrangement is not limited to comparisons with three-place digital values—i.e., set values—and, as will be readily apparent, can be devised for digital values—i.e., set values—having a number of places other than three. Instead of a set value being compared with an actual value, some other digital value can be compared with an analogue value.

The data support, instead of being a perforated tape 15, 61, 63, 74 or 77, can be in the form of punched cards, punched strips manually or remotely controlled stepping switches, relay chains, crossbar selectors or the like; similarly, these components can be used as means for representing the digital value. Some of the electrical circuitry can be replaced by electronic circuitry. As a further development, various embodiments hereinbefore described can be combined with one another.

In an embodiment using a comparative circuit arrangement comprising radiation control, for instance, photo control, it may be for various reasons be desirable for the sizes and other technical data of individual parts to be able to be dimensioned less dependently of one another. In the example illustrated in FIG. 1, the brightness current to darkness current ratio of the photocell 42 has a technical bearing on the dimensioning of the subsequent flip-flop amplifier 44 and light source 41. The better this ratio is, the less is the outlay required for the amplifier to give a reliable yes/no statement about an order signal. If the ratio is very good, the photo current of the light source can be reduced. As already stated, if the ratio is unsatisfactory, the single photocell can be replaced by a number of smaller photocells which feed into amplifiers to produce component order signals which are logically combined to form one order signal. Of course, this means a corresponding outlay when a number of photocells are required. The ratio is improved by reduction of the darkness current. The same depends, as a rule, upon the size of the photosensitive area of the photocell, amongst other variables. If photocells having a smaller photo-sensitive area of the same kind can be used, there is usually a considerable improvement in the ratio provided that the light current which is incident upon the photo-sensitive surface of the photocell and which controls the darkness current remains constant. Often, a photocell of this kind has a higher cutoff frequency, so that the maximum permissible change in the analogue value per unit of time is increased—i.e., the minimum time required for reliable comparison can be decreased. A description will be given hereinafter of how to proceed in order to be able to dimension the means for representing the digital value, the means for representing the analogue value and the radiation-measuring cells and radiation sources so that their sizes are less dependent of one another; more particularly, this enables relatively weak radiation sources and radiation-measuring cells having a small radiation-sensitive area in relation to the required area of the means for representing the digital value and/or of the means for representing the analogue value to be used. This is achieved by the provision of means for deflecting beams, and the size of the required area of the said first means for representing the digital value, the size of the control areas of the said second means for representing the analogue value, the size of the radiation-sensitive area of at least one radiation measurement cell and the size of the radiant area of at least one radiation source or portions of these four sizes are constructionally adapted to one another by the beam-deflecting means.

Figure 11:
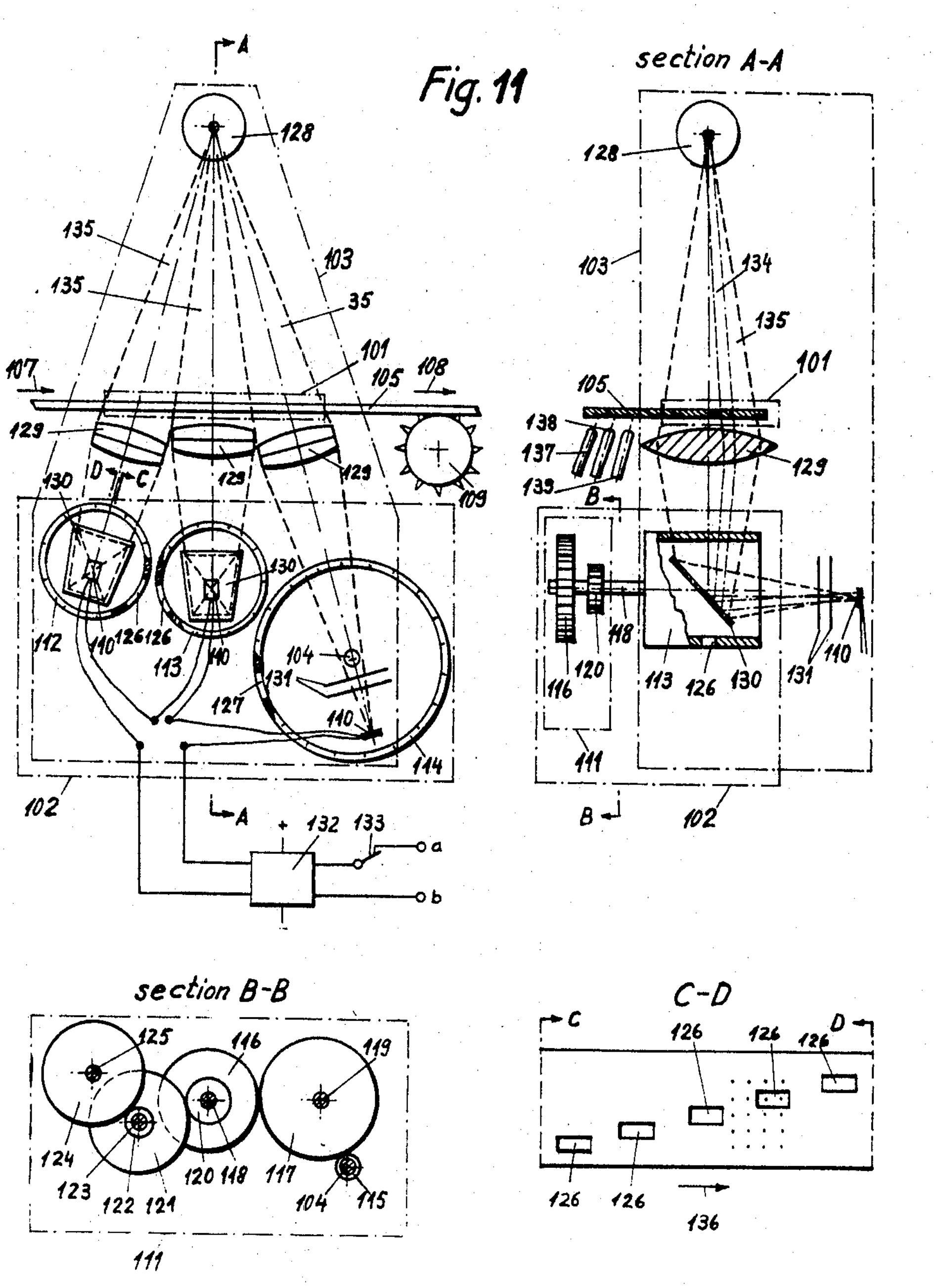
FIG. 11 illustrates another embodiment having a photo-switching comparison circuit arrangement.
Figure 12:
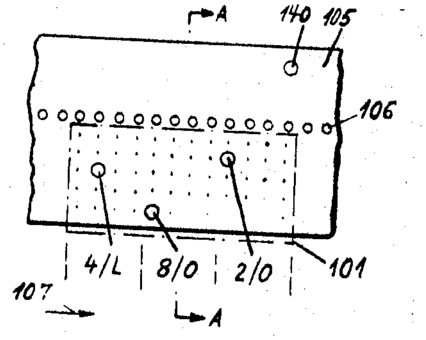
FIG. 12 illustrates a portion of a perforated tape suitable for FIG. 11.

In the embodiment shown in FIGS. 11 and 12, the main parts of the arrangement are first means 101, second means 102 and a comparison circuit arrangement 103. To make matters clearer, it will be assumed that this embodiment is used for the same purpose as the embodiment illustrated in FIG. 1—i.e., making comparisons between a set value and an actual value, the position of a lathe carriage being determined by the actual value of a distance from a zero point, the set value for such distance being programmed on an information support, and an order signal being produced by the arrangement in the event of coincidence between the set value and the actual value. An analogue value—i.e., the actual value—is represented in analogue form by the angle through which a shaft 104 of the second means 102 rotates from a zero position (the same will be described in greater detail hereinafter). The shaft 104 is rotated in the same way as the shaft 4 in the case of FIG. 1. By way of example, the shaft 104 of this present case performs one revolution for a change of 20 mm. in the analogue value. A digital value—i.e., the set value—is, for instance, 482 mm. as in the previous embodiment and is represented as a three-place decimal number.

Figure 13:
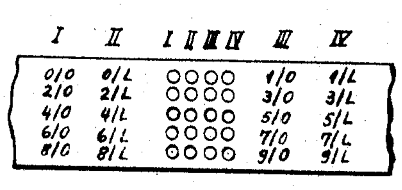
FIG. 13 illustrates a perforated pattern.

The digital value is represented in encoded form by means of perforations in a perforated tape 105 shown in FIG. 12. The tape 105 which is, for instance, standard 1" wide perforated tape, has eight tracks and one transport track formed with transport perforations 106. In this embodiment the digital value and the auxiliary values cooperate after derivation to form a data item which is stored in the tape 105. Perforating proceeds as follows: a programmer derives one auxiliary value from every place except from the highest. An auxiliary value 0 is derived from the digits 0 to 4 and an auxiliary value L is derived from the digits 5 to 9. The auxiliary values have the designation of the place immediately above the place from which they have been derived. The 2nd auxiliary value affects the encoding of the digit of the 2nd place, and the 3rd auxiliary value affects the encoding of the digit of the 3rd place. For instance, in the case of the digital value 482 mm., the 3rd auxiliary value L is derived from the digit 8 in the 2nd place and affects the encoding of the digit 4 of the 3rd place. FIG. 13 illustrates a perforation pattern indicating the position of the perforations for the various digits of one place; a hole is punched in the tape 105 for a digit and the auxiliary value affecting the encoding thereof. There are therefore two possible encodings for any one digit one possibility when the operative auxiliary value 0 is present, and another possibility when the operative auxiliary value L is present. The holes are referred to by the digit and auxiliary value associated with them as, for instance, 4/*L*. FIG. 12 shows the three-hole perforation 4/*L*, 8/0 and 2/0 for the digital value of 482 mm. in accordance with the perforation pattern illustrated in FIG. 13; the "1st auxiliary value 0" has been assumed for the encoding of the digit of the 1st place since no "1st auxiliary value 0" can be derived. The positions of the unpunched holes in the tape 105 for the digital value of 482 mm. are shown as dots. As the pattern in FIG. 13 shows, each place occupies four lines of the tape—i.e., twelve consecutive lines are required for the complete digital value. The perforations for the three places extends in a direction 107 in the same order as the order in which the three digits occur in the digital value. If required, the auxiliary values can be derived, for instance, by means of a mechanical device which is, with advantage, combined with a tape perforator. In this case the programmer requires a keyboard of the kind conventional in ordinary mechanical table calculating machines. A corresponding digit of the highest place is marked by operation of a key, so that two perforating punches are seized by a mechanism. These two punches are those required to punch a hole corresponding to the marked digit, since there are two possible encodings of any digit. At the next operation of a key to mark a digit of the immediately lower place, a simple mechanism decides which of the two punches is definitely marked—i.e., one for a digit from 0 to 4 of this immediately lower place, and the other for a digit from 5 to 9—i.e., the auxiliary value is derived and the corresponding encoding selected. This latter keying operation also seizes two punches. This cycle of operations is repeated for all the digits of the digital value, the assumed "1st auxiliary value" being keyed at the end, although it can if required be preset as a fixed value. All the marked punches are then depressed to punch the perforations. If, contrary to what is customary, the digital value is keyed from lower towards higher places, an auxiliary value is of course first derived for one place, so that a group of ten punches is seized and one punch of the group is earmarked. Instead of punching all the perforations for the digital value together, a perforator can be devised to punch each hole individually immediately it has been determined.

The tape 105 is transported one step in a direction 108, by means of a gear 109 whose teeth engage in the transport perforations 106. The perforated representation of the digital value is therefore given into the arrangement 103.

The first means 101, which can be seen in FIGS. 11 and 12 have the piece of tape 105 which by means of the perforation represents the digital value in digital form and which is in the arrangement 103. The material used for the tape 105 should be highly impervious to light; if need be, however, it can pass considerable light provided that the light thus passed is diffusely distributed by the material of the tape 105 and that the photocells 110 are at some distance from the means 101.

The second means 102 comprise a multi-stage transmission 111 (section along the line B—B) and three drums or rollers or the like 112–114. By way of gears 115, 116 and intermediate gear 117, a shaft 104 drives the shaft 118. The intermediate gear 117 is mounted on a shaft 119. By way of gears 121, 122 on a countershaft 123, a gear 120 on the shaft 118 drives a gear 124 on a shaft 125. The reductions in the transmission 111 are such that the angle of rotation of the shaft 118 is five times less than the angle of rotation of the shaft 104, and the angle of rotation of the shaft 125 is ten times less than the angle of rotation of the shaft 118. In other words, the shaft 118 performs one revolution for a 100 mm. change in the analogue value, and the shaft 125 performs one revolution for a 1000 mm. change in the analogue value. Advantageously, all the gears 115–117, 120–122 and 124 are externally toothed and the shafts 104, 118, 119, 123, 125 with their bearings can be mounted well. The drum 112 is mounted on the shaft 125 and the drum 113 is mounted on the shaft 118. The cylindrical surface of the drums 112, 113 is in each case formed with five windows 126. The same are uniformly distributed, as the developed view along the line C—D in FIG. 11 shows. The drum 114 is mounted on the shaft 104. The generated surface of the drum 114 is formed with two series, each of five windows 127, disposed one beside another along the drum periphery. Each series of five windows is disposed on one half of the generated surface of the drum 114 in the same way as shown in the developed view along the line C—D. In the elevation in FIG. 11, only one window 126 (or 127) is marked for each drum 112, 113, 114. The generated surfaces of the drum 112–114 are made of a light-impervious material. The drums 112–114 rotate clockwise for an increase in analogue value and anti-clockwise for a decrease in analogue value.

The comparison circuit arrangement 103 has a light source 128, three lenses 129, two mirrors 130, three photocells 110 and balancing elements 131. The means 101 and the means 102 comprising the drums 112–114 also participate directly in the arrangement 103. The three photocells 110 are connected in series with one another and deliver to a flip-flop amplifier 132 which, via a closed contact 133, can deliver order signals in the form of a control voltage between terminals *a* and *b*. The amplifier 132 is connected to a power pack taken to the positive and negative terminals. Conveniently, since the photocells 110 are connected in series, the individual photocells used are of a kind having a high differential internal resistance, such as silicon photo-transistors (unconnected base). The photocells 110 have a switching action in the series arrangement. FIG. 11 does not show any casing, tape guide (FIG. 14) nor glasses to protect the lenses 129 from dirt.

The balancing elements 131 are disposed before the photocells 110 and comprise one or more thin glass panes. Only some of the radiation incident on each such pane passes therethrough. The remainder—about 10% in the case of clear glass—is mainly reflected and absorbed. The radiation incident on any photocell 110 can therefore be reduced stepwise by means of a number of panes. The electrical conductance of each cell 110 when irradiated can therefore be balanced to a consistent value, more particularly since, as a rule, the photosensitivity of the cells 110 varies considerably as between individual photocells. If each photocell 110 is connected to a separate amplifier, the same can be included in the balancing system. Instead of a number of panes being used to balance a photocell 110, only a single pane need be used which has an appropriate transmissivity and which is made, for instance, of filter glass.

The sizes and other technical data of parts, previously referred to—i.e., of the first and second means 101 and 102 respectively, of the light source 128 and of the photocells 110—can be constructionally adapted to one another by means of the lenses 129. The light source 128, for instance, a low-wattage small-coil incandescent lamp, illuminates the means 101. The perforation for the digital value allows a small beam 134 for each place to pass through one lens 129 to the drum 112 or 113 or 114 and therefrom, if the drum is appropriately positioned, through a window 126 or 127 to a photocell 110. The path followed by a beam 134 is schematically illustrated just in sectional view along the line A—A in FIG. 11. The beam for the second and third place is reflected by a mirror 130 on its way from the drum 112 or 113 to a photocell 110. If it is imagined that all the sixty possible code perforations of the means 101 have been perforated and the drums 112–114 have been dismantled, there is for each place a total beam 135 composed of twenty small beams 134 which combine to form an image of the light source 128. Three images thereof are therefore formed. Considering matters from another point of view, we can say that an image is formed of each photocell 110. The space in which the total beams 135 spread out is bounded by chain lines in FIG. 11, the case shown being the ideal one with a dot-like light source 128 and lenses 129 without error. The photocells 110 are disposed approximately where the total beams 135 have their smallest cross-section near the image—i.e., near the images of the light source 128. The position and size of the assembled drums 112–114, of the windows 126, 127 and of the total beams 135 are so adapted to one another that either two beams 134 of one total beam 135 pass entirely through one or two windows 126 or 127 of the drums 112 or 113 or 114 or one beam 134 of a total beam 135 passes completely, and two beams 134 pass partly, through one or two windows 126 or 127 of the drums 112 or 113 or 114, and that the corresponding total beam 135 is intersected near enough to the first means 101 by the drum 112 or 113 or 114 where the individual beams 134 are still uncombined. The centres of the beams 134 are denoted by dots in the developed view along the line C—D on the drum 112 or 113, to show how they occur on the generated surface of the drum, for instance, in one particular position of the drum 112 or 113. Each window 126 or 127 is coordinated with a predetermined track of the tape 105.

The means 102 are in the zero position when, of each of the three total beams 135, the two beams 134 through the perforations 0/0 and 9/*L*, can reach the corresponding photocell 110 simultaneously.

Every angle of rotation from the zero position of the shafts 104, 118, 125 represents the analogue value, for each analogue value, the windows 126 and 127 of the drums 112, 113, 114 take up a definite position based on the angles of rotation. This position—characteristic of an analogue value—of the windows 126 and 127 in the drums 112–114 relatively to the lenses 129 is compared in the arrangement 103 with the digital value perforation, the auxiliary values being used by the encoding of each digit being affected by the auxiliary values.

If it is imagined that the developed view along the line C—D of the drum 112 moves in the direction indicated by an arrow 136 and one particular beam 134 remains stationary, it will be apparent how at a particular position of the drum 112 such beam 134 can pass through a particular window 126 and reach the corresponding photocell 110. It will be assumed that the digital value is, as in this example, 482 mm., that the analogue value is initially 355 mm. and that, after the giving of the perforation into the circuit arrangement 103, the analogue value increases continuously to 530 mm. At an analogue value between 362 mm. and 362.5 mm. the photocell 110 of the 1st place is fully illuminated, and this condition recurs at each 10 mm. increase in the analogue value. At an analogue value between 380 and 385 mm. and between 480 and 485 mm., the photocell 110 of the 2nd place is fully illuminated. At an analogue value between 450 and 500 mm. the photocell 110 of the 3rd place is fully illuminated. Provided that there is no coincidence between the digital value and the analogue value, either none or one or two of the three beams 134 simultaneously reach the photocells 110—i.e., at least one beam 134 is incident on a drum 112 or 113 or 114 and cannot pass through a window 126 or 127. In the event of coincidence between the digital value and the analogue value, all the photocells 110 are illuminated simultaneously by the three beams 134 and therefore become electrically conductive, so that an order signal is produced. The flip-flop amplifier 132 is so adjusted that no order signal is transmitted unless all the three photocells 110 are illuminated. The contact 113 is opened to suppress unwanted order signals for the time that the perforation representing the digital value is being given into the comparison circuit arrangement 103. The giving of a perforation for a new digital value removes the previous perforation from the arrangement 103. As previously stated, the order signal can be used more particularly to initiate the give of a perforation representing a new digital value.

As in the previous case, the purpose of the auxiliary values is to ensure a satisfactory comparison by causing that of the two possible code holes for any digit the one to be selected which ensures that the associated beam 134 passes completely and reliably through a particular window 126 when the second means 102 are in the appropriate position. This does not apply to the two possible code holes for a digit of the 1st place since of course a "1st auxiliary value" has been assumed for the sake of simplicity. If only one beam 134 were available for a digit of the 2nd and 3rd place and the corresponding auxiliary value were not used, there might be cases—more particularly if the immediately lower place of the digital value had the digit 0 or 9—in which such beam 134 might only partly pass through a window 126 when the order signal was required, or else, if the dimensioning were different, wrong order signals might be produced.

Holes for control orders, for instance, movement orders, for each digital value can be punched in those three tracks of the tape 105 which are not used for digital value perforations. These control-order holes are scanned by photocells during a comparison (block readout) or are scanned by three photocells 137–139 while a perforation is being given into the arrangement 103 (series readout).

When the perforations for a number of digital values always follow one another at the same interval, the drive of the gear 109 can be so devised that an order signal always makes the gear 109 rotate through an equal increment. If the perforations do not follow one another at equal intervals, more particularly at the beginning and at the end of a programme, the tape 105 is formed with extra holes, such as a hole 140 which causes the tape 105 to be positioned at a particular position. To this end, the gear 109 is rotated by an order signal or some other signal. When the hole 140 registers with the photocell 137, a control impulse is triggered off to stop the drive of the gear 109.

Figure 14:
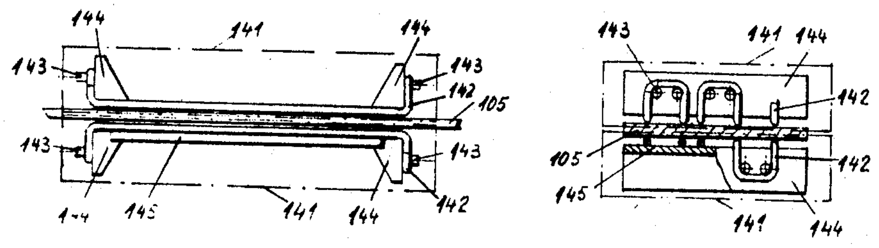
FIG. 14 illustrates one possible form for a perforated tape guide.

FIG. 14 illustrates an embodiment for a tape guide such as can be used, for instance, to guide the tape 105 through the arrangement 103. The tap 105 moves between two symmetrical wire tracks 141. One track 141 is made of a thin wire 142 which is bent backwards and forwards a number of times around pegs or pins or the like 143. The start and end of the wire 142 are secured at two supports 144. The diameter and position of the wire 142 are such that the same extends between the tracks of the tape. The bottom wire track 141 can either rest on a protective glass 145 or can hang self-supportingly. These wire tracks 141 reduce soiling and scratching of the bottom protective glass 145 and save a top protective glass as compared with a guide of the kind in which the tape 105 is directly guided by two protective glasses.

Photocells 110 other than those of the kind having a high differential internal resistance can be used, although it may then be necessary for each photocell to be connected to a separate amplifier, component order signals being produced, then being logically combined to form the complete order signal.

The minimum size of the photo-sensitive area of a photocell 110 depends upon a large number of factors which can briefly be set forth as: size of image of light source 128 (e.g. forming of image of coil in the case of an incadescent lamp), position of photocell in total beam 135 (in, before or after the image of the coil), lens errors, such as spherical aberration, chromatic aberration of the lens 129 within the light spectrum used or within the radiation. Lens errors can be reduced in known manner.

A diaphragm with twenty apertures—i.e., only one aperture for each beam 134—can be disposed in each total beam 135. Such diaphragms or masks can serve a very wide variety of purposes depending upon their position, for instance, near the first means 101 or between the lenses 129 and the second means 102. The possible purposes for which such masks can be used are: increased tolerance for the accuracy with which the first means 101 are positioned, increased tolerances for the first means and/or second means 102 (e.g. greater tolerances for the transmission 111 as regards tooth backlash, axial backlash, radial backlash), masking of edge rays of the beams 134 at particular positions, and so on. By means of mask apertures of various sizes, differences in the irradiation of a photocell 110 by the various beans 134 can be balanced out. Instead of the mirrors 130, prisms having a totally reflecting surface can be used. To increase the light output, a hollow mirror can be disposed behind the light source 128 so as to form an image of the coil at the coil.

If the shaft 104 were to perform only one revolution for a change in the analogue value of 50 mm. instead of 20 mm., the drum 114 would have to be correspondingly larger and have five series of windows, while the reduction from the shaft 104 to the shaft 118 would have to go down from 1:5 to 1:2. Similarly, if the shaft 104 were to perform one revolution for a 10 mm. change in the analogue value, the arrangement for the 1st place would have to be the same as for the 2nd place and the reduction would have to be altered to 1:10. This enables the speeds of the shafts 104, 118, 125 to be varied and to be adapted to operating conditions; more particularly, this makes it possible for the shaft 104 not to have to run at high speeds.

Of course, embodiments of the arrangement can be devised for comparisons with digital values having other than three places. Similarly, the 1 mm. minimum increment chosen for the embodiment described can vary. A construction comprising a number of consecutive component systems can be used for digital values having a large number of places; for instance, for comparisons involving nine-place digital values, a 1st component construction of the kind shown in FIG. 11 can be placed in the position shown, a second component construction symmetrical of FIG. 11 can be arranged with the tape 105 as the plane of symmetry, and a third component construction as shown in FIG. 1 can be used in the position illustrated, these three component constructions being placed in contiguous relationship with one another. The transmission systems of these various component constructions are coupled together in some appropriate fashion. Each component construction produces a component order signal, and the various component order signals are combined logically to form one complete order signal. The perforation for the digital value can therefore be punched continuously without free lines of the tape having to be provided between the perforation for each set of three places.

If the focus of the lenses 129 for the 2nd and 3rd places are short enough and the other dimensioning is appropriately adapted, the mirrors 130 can be omitted.

A light source can be arranged for each total beam and, for instance, the axes of the total beams can be placed parallel with one another, so that on one side of the first means 101 there are a light source for the 1st place, a drum for the 2nd place and a light source for the 3rd place, while on the other side there are a drum for the 1st place, a light source for the 2nd place and a drum for the 3rd place. In this case a gearing without intermediate gears and countershaft is used to reverse the hand of rotation. The first means 101 can be used unchanged.

Free lines can for various reasons be provided in the tape 105 between the perforation representing the various places, for instance, in order that the drums 112 and 113 may be replaced by larger drums.

Other possibilities derive from the knowledge that, optically speaking, photocells and light sources of a comparison circuit arrangement can, in principle, be changed over in the arrangement, and/or that the normally de-energized system shown can be replaced by a normally energized system—i.e., a system in which a photo current flows for at least one photocell until the production of an order signal.

Figure 15:
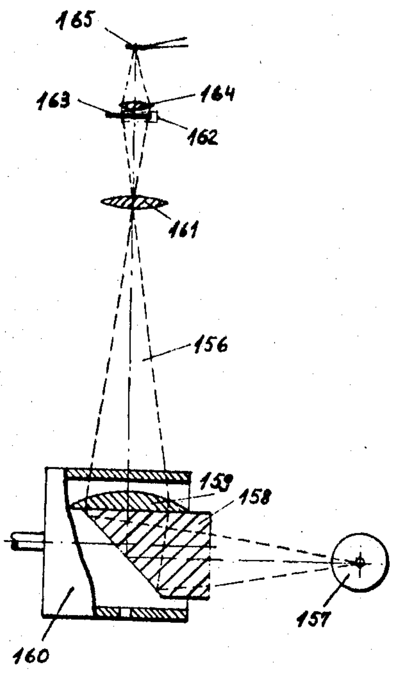
FIG. 15 illustrates one possible way of using very small means for representing the digital value.

In practical construction of the arrangement, images can be formed of areas of the first means for representing a digital value, operative areas of the second means for representing an analogue value, radiation sources and radiation-measuring cells. The images of these items can be enlarged or reduced or to the same scale as the items themselves. Consequently, for instance, very small means for representing a digital value, and relatively large means for representing an analogue value, or vice versa, can be used in a single construction. An embodiment of the first case is diagrammatically shown in FIG. 15 which is a view, in a section corresponding to the section along the line A—A in FIG. 11, of a total beam 156 for one place. A light source 157 illuminates a prism 158 having a totally reflecting surface and a condensing lens 159 thereon; a drum 160 having the same function as, for instance, the drum 113 is therefore illuminated. Through the agency of the lens 161, an image is formed of a portion of the drum by images being formed of those windows in the drum 160 through which radiation is passing. Since the image of the drum portion is reversed, the hand of rotation of the drum 160 is opposite to the hand of rotation of the drum 113 and the windows are arranged symmetrically. The drum portion corresponds to that part of the drum 113 which is irradiated by the total beam 135. As information support and means 162 for representing a digital value, a miniature tape 163 is used which has a perforation geometrically similar to that of the tape 105. The image of the drum portion falls in the plane of the means 162. The means 162 for the particular place concerned register with the image of the drum portion. A lens 164 collects the radiation passing through the means 162. Either a single photocell 165 is provided for each place or just a single photocell is provided for all the places jointly. In the light of the description hereinbefore given, the remainder of the operation of this embodiment will be readily apparent. The advantage of this construction is that the tape 163 forms an information support requiring very little space and is very suitable for archives. The lens 164 could be omitted and, instead of a photocell 165 immediately behind the means 162, a larger photocell could be provided, but with the disadvantages previously referred to. Instead of the miniature tape 163, a blackened film strip can be used in which, instead of the code holes, the film strip is not blackened at the same position.

If the light source 128 in the comparison circuit arrangement 103 is an incandescent lamp having a colour temperature of 2800° K. and silicon phototransistors are used as the photocells 110, the arrangement 103 can operate on invisible light or infra-red radiation as well as on visible light. The arrangement can be embodied to operate on some form of radiation other than light, the light sources being replaced by appropriate radiation sources, and the photocells being replaced by appropriate radiation-measuring cells.

As further alternative forms of the arrangement, various embodiments can be combined with one another.

I claim:

1. Apparatus for comparing an analogue value with a digital value having at least two places with a digit in each place, said apparatus comprising an analogue system including shaft means and at least two rotary blocking elements in said analogue system, at least one source of energy, at least one sensitive element which is sensitive to the energy of said source for producing a signal in the event of equality between said analogue value and said digital value, said rotary blocking elements being driven by said shaft means and arranged between said source of energy and said sensitive element, a plurality of paths for the flow of portions of energy from said source to said sensitive element, said paths being divided into at least two groups which correspond to said places, said blocking elements being operable for opening and closing energy passage in said paths in dependence on said analogue value, a data carrier between said source and said sensitive element for opening and closing said paths for energy passage depending upon the digital value on said data carrier whereby in at least one path group of a higher significant place paths are closed and opened for energy passage in dependence on at least one digit of a lower significant place of the digital value and independent of the analogue value.

2. Apparatus as set forth in claim 1, wherein said rotary blocking elements include a series of rotary arms each provided with a masking plate movable between said source of energy and said sensitive element.

3. Apparatus as set forth in claim 1, wherein said rotary blocking elements comprise at least two masking cylinders.

4. Apparatus as set forth in claim 1 in which said shaft means is drivingly connected to two sets of blocking arms by different ratio gearing, and masking plates on the ends of said arms interrupt said paths above the data carrier and the sensitive element.

5. Apparatus as set forth in claim 1 wherein the analogue value is transmitted by electric selsyn motors.

6. Apparatus as set forth in claim 1 in which said data carried is a punched tape.

7. Apparatus as set forth in claim 1 in which said rotary blocking elements are coupled together by gear means.

8. Apparatus as set forth in claim 1 wherein said source of energy is electrical energy.

9. Apparatus as set forth in claim 1 wherein said source of energy is a light source or a radiation source.

10. Apparatus as set forth in claim 9 wherein said paths are formed by optical means.

11. Apparatus as set forth in claim 10, in which said optical means are lenses.

12. Apparatus as set forth in claim 1 wherein the axis of rotation of at least one blocking-element is perpendicular to the direction in which the various places of said digital value are represented on said data carrier.

13. Apparatus as set forth in claim 1 wherein wire tracks are provided to guide said data carrier.

References Cited

UNITED STATES PATENTS

| | | | |
|---|---|---|---|
| 2,747,797 | 5/1956 | Beaumont | 340—347 X |
| 3,078,404 | 2/1963 | Dumaire | 340—347 X |
| 2,866,184 | 12/1958 | Gray | 340—347 |
| 2,700,076 | 1/1955 | Goode. | |
| 3,034,715 | 5/1962 | Wagner | 340—347 X |

MALCOLM A. MORRISON, Primary Examiner

D. H. MALZAHN, Assistant Examiner

U.S. Cl. X.R.

340—347; 324—99; 90—13; 82—14